(12) United States Patent
Poirier

(10) Patent No.: US 10,801,900 B2
(45) Date of Patent: Oct. 13, 2020

(54) INSPECTION AID

(71) Applicant: FORD GLOBAL TECHNOLOGIES, LLC, Dearborn, MI (US)

(72) Inventor: Eric Poirier, Warren, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1505 days.

(21) Appl. No.: 14/329,461

(22) Filed: Jul. 11, 2014

(65) Prior Publication Data

US 2016/0011270 A1    Jan. 14, 2016

(51) Int. Cl.
| | |
|---|---|
| *G01R 31/36* | (2020.01) |
| *G01K 11/12* | (2006.01) |
| *H01M 10/48* | (2006.01) |
| *H01M 10/0525* | (2010.01) |

(52) U.S. Cl.
CPC .......... *G01K 11/12* (2013.01); *H01M 10/486* (2013.01); *H01M 10/488* (2013.01); *H01M 10/0525* (2013.01); *H01M 2220/20* (2013.01); *Y02E 60/122* (2013.01)

(58) Field of Classification Search
CPC ................................................. G01R 31/3627
USPC ....................................................... 324/426
See application file for complete search history.

(56) References Cited

U.S. PATENT DOCUMENTS

| | | | | |
|---|---|---|---|---|
| 5,667,538 A | * | 9/1997 | Bailey ................. | G01R 13/403 29/623.5 |
| 6,685,094 B2 | | 2/2004 | Cameron | |
| 6,878,481 B2 | * | 4/2005 | Bushong ............. | H01M 2/0421 429/175 |
| 7,477,995 B2 | * | 1/2009 | Hovis ................ | G01D 5/34707 356/32 |
| 8,091,776 B2 | * | 1/2012 | Nemet ................... | G06Q 30/06 235/376 |
| 8,395,519 B2 | * | 3/2013 | Cassidy ............. | H01M 2/1016 340/636.1 |
| 9,231,416 B2 | * | 1/2016 | Kim ...................... | H02J 7/0026 |
| 2002/0119364 A1 | * | 8/2002 | Bushong ................ | H01M 2/34 429/61 |
| 2006/0008699 A1 | * | 1/2006 | Um ....................... | H01M 6/505 429/90 |
| 2009/0020609 A1 | * | 1/2009 | Cohen .................. | G06K 7/1095 235/462.01 |
| 2009/0192731 A1 | * | 7/2009 | De Jesus ............. | E21B 47/0006 702/42 |
| 2010/0315248 A1 | * | 12/2010 | Townsend ................ | G01B 7/16 340/635 |
| 2012/0126991 A1 | | 5/2012 | Cassidy | |
| 2012/0148890 A1 | * | 6/2012 | Goto ................... | H01M 2/1077 429/90 |
| 2013/0193976 A1 | * | 8/2013 | Hostetter ............. | G01R 31/362 324/427 |

(Continued)

*Primary Examiner* — Richard Isla
*Assistant Examiner* — Tessema Kebede
(74) *Attorney, Agent, or Firm* — David Kelley, Esq.; Carlson, Gaskey & Olds, P.C.

(57) ABSTRACT

An example battery inspection aid includes a label having a temperature responsive portion that indicates temperature changes and a strain responsive portion that indicates positional changes. An example method of inspecting a battery includes detecting changes in a temperature of a battery from a temperature responsive portion of a label, and detecting changes in a strain of the battery from a strain responsive portion of the label.

23 Claims, 3 Drawing Sheets

(56) References Cited

U.S. PATENT DOCUMENTS

2014/0370344 A1\* 12/2014 Lovelace .............. H01M 2/344
              429/90
2015/0280290 A1\* 10/2015 Saha .................... H01M 10/48
              429/50

\* cited by examiner

INSPECTION AID

BACKGROUND

Electrified vehicles use electric machines for propulsion. Electric vehicles, hybrid electric vehicles (HEVs) and plug-in hybrid electric vehicles (PHEVs) are example types of electric vehicles.

Batteries power the electric machines. Inspecting, servicing, and replacing the batteries and other components is sometimes required. Various factors impact decisions to initiate additional inspections, service, or replace components.

SUMMARY

An inspection aid according to an exemplary aspect of the present disclosure includes, among other things, a label having a temperature responsive portion that indicates temperature changes, and a strain responsive portion that indicates positional changes.

In a further non-limiting embodiment of the foregoing inspection aid, the temperature responsive portion comprises a thermochromic material that changes color in response to temperature changes.

In a further non-limiting embodiment of any of the foregoing inspection aids, the thermochromic material comprises thermochromic ink.

In a further non-limiting embodiment of any of the foregoing inspection aids, the strain responsive portion comprises a plurality of reference coordinates that move relative to each other in response to expansion or contraction of the label.

In a further non-limiting embodiment of any of the foregoing inspection aids, a first one of the plurality of the reference points is spaced a distance from a second one of the plurality of reference points. The distance increases in response to a pressure within a battery increasing. The distance decreases in response to the pressure within the battery decreasing. Alternatively, some permanent distance increases are also possible as a result of plastic deformations following high pressure exposure.

In a further non-limiting embodiment of any of the foregoing inspection aids, the device includes an identification portion of the label. The identification portion contains identification information.

In a further non-limiting embodiment of any of the foregoing inspection aids, the identification portion provides at least some of the temperature responsive portion and at least some of the strain responsive portion.

In a further non-limiting embodiment of any of the foregoing inspection aids, the identification portion comprises a bar code.

In a further non-limiting embodiment of any of the foregoing inspection aids, the identification portion comprises a quick response code.

In a further non-limiting embodiment of any of the foregoing inspection aids, the label is attached to a battery cell.

In a further non-limiting embodiment of any of the foregoing inspection aids, the label is printed on a lithium ion battery cell.

A method of inspecting a battery according to an exemplary aspect of the present disclosure includes, among other things, detecting changes in a temperature of a battery from a temperature responsive portion of a label, and detecting changes in a strain of the battery from a strain responsive portion of the label.

In a further non-limiting embodiment of the foregoing method, changes in a color of the temperature responsive portion indicate a change in temperature.

In a further non-limiting embodiment of any of the foregoing methods, the strain responsive portion comprises reference coordinates, and a change in a relative position of the reference coordinates indicates a change in strain.

In a further non-limiting embodiment of any of the foregoing methods, the method includes optically reading the label to collect the color and the position.

In a further non-limiting embodiment of any of the foregoing methods, a distance between at least some of the reference coordinates that increases over time indicates more strain, and a distance between at least some of the reference coordinates that decreases over time indicates less strain.

In a further non-limiting embodiment of any of the foregoing methods, the method includes estimating pressure within the battery using strain.

In a further non-limiting embodiment of any of the foregoing methods, the method includes further collecting identification information about the battery during an optical reading of an information portion of the label.

In a further non-limiting embodiment of any of the foregoing methods, the method includes securing the label directly to the battery.

In a further non-limiting embodiment of any of the foregoing methods, the method includes painting the label directly on the battery.

In a further non-limiting embodiment of any of the foregoing methods, the method includes referencing a database during the detecting, the database comprising at least one reference color associated with at least one temperature, a measurement of strain associated with a pressure, or both.

In a further non-limiting embodiment of any of the foregoing methods, the method includes updating the database using information from during the detecting.

In a further non-limiting embodiment of any of the foregoing methods, the method includes diagnosing that a battery should be replaced based on the changes in the temperature, the changes in the strain, or both.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to inspecting and diagnosing components and, more specifically, to monitoring variables, such as a battery cell's temperature and internal pressure. This disclosure involves monitoring these variables using a common label.

Figure 1:
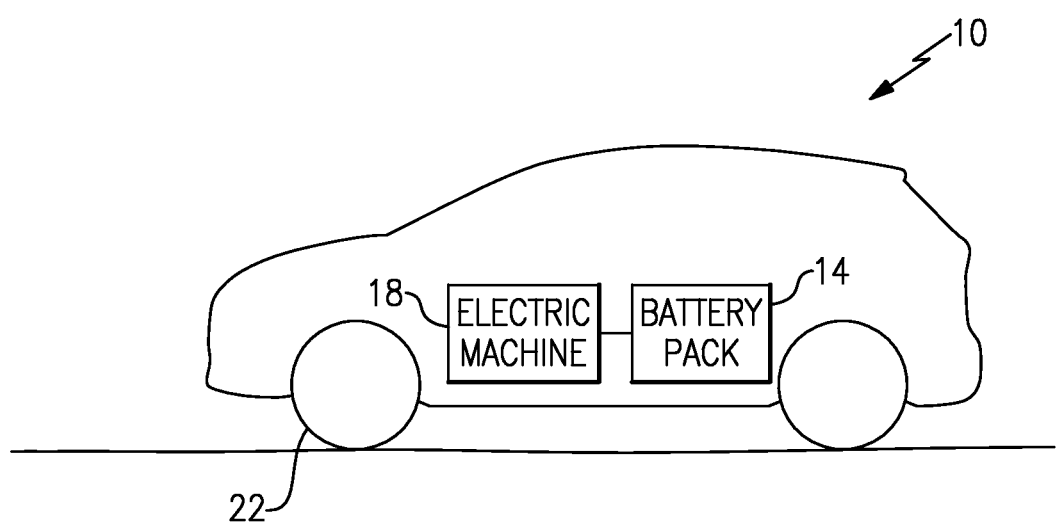
FIG. 1 illustrates a schematic view of an example electric vehicle.

Referring to FIG. 1, an example electric vehicle 10 includes a battery pack 14 to power an electric machine 18. The vehicle includes wheels 22 driven by the electric machine 18. The electric machine 18 receives electric power from the battery pack 14 and converts the electric power to torque.

The example vehicle 10 is an all-electric vehicle. In other examples, vehicle 10 is a hybrid electric vehicle, which selectively drives wheels using an internal combustion engine instead of, or in addition to, the electric machine 18. In hybrid electric examples, the electric machine 18 may selectively operate as a generator to recharge the battery pack 14.

Figure 2:
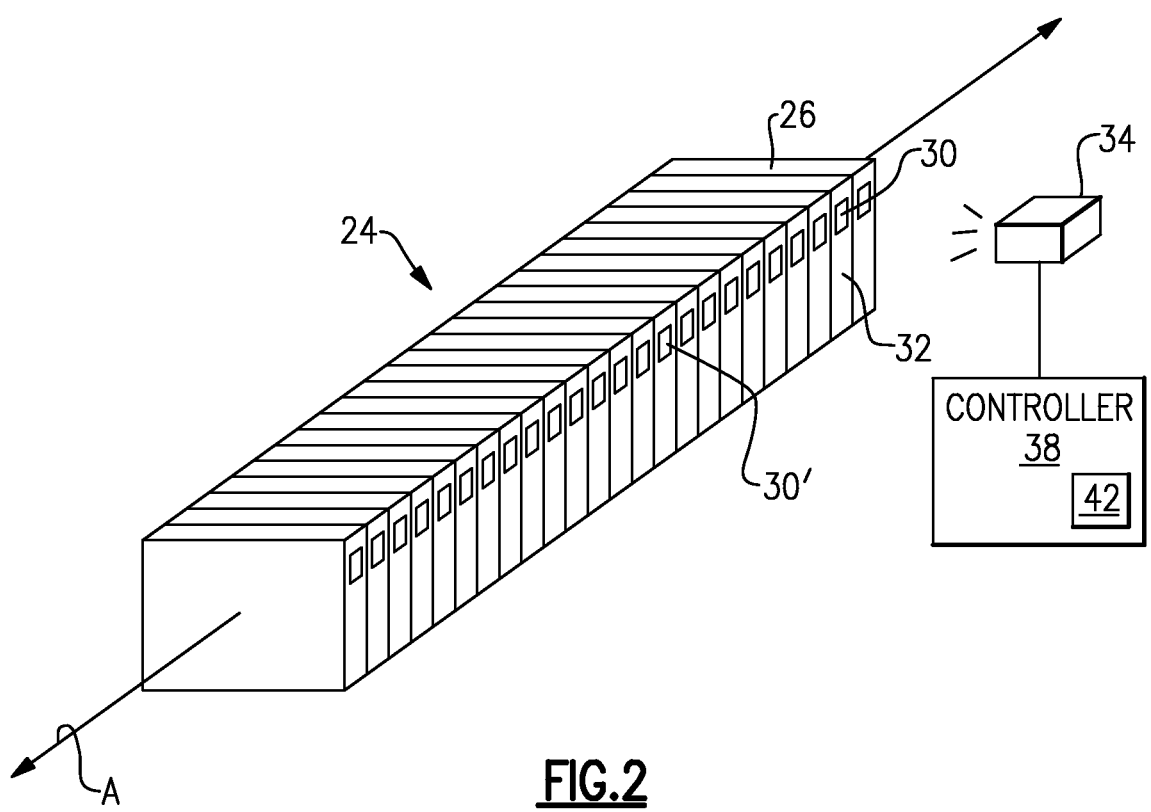
FIG. 2 illustrates a perspective view of an optical device inspecting battery cells from a battery pack of the electric vehicle of FIG. 1.
Figure 3:
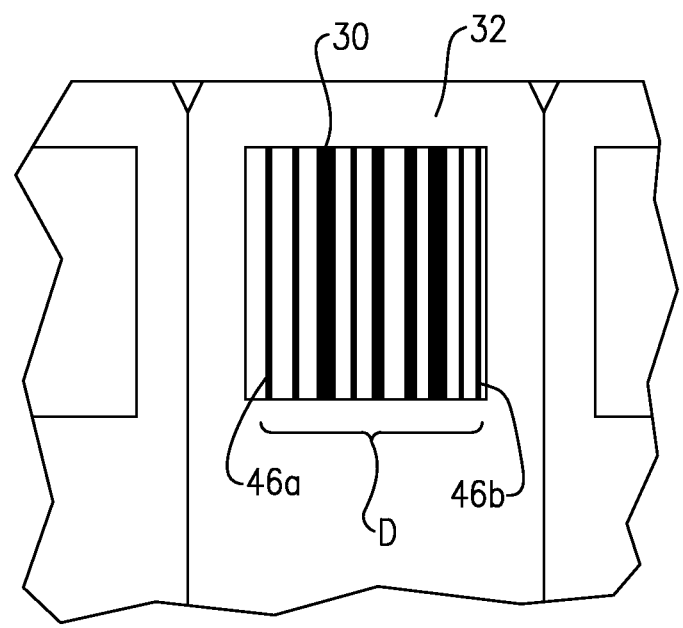
FIG. 3 illustrates a close-up side view of one of the battery cells from FIG. 2 showing a label according to an embodiment of the present disclosure.

Referring now to FIGS. 2 and 3, the battery pack 14 includes an array 24 of battery cells 26 disposed along an axis A. The battery cells 26 may be compressed axially by end walls (not shown) other components such as side walls and covers may surround other sides of the battery cells 26. In some example embodiments, the battery pack 14 may include from 50 to 500 individual battery cells 26 within the array 24. In other examples, the battery pack 14 may include just a single cell. The cells are lithium ion cells in this example.

A label 30 is secured to an outwardly facing surface 32 of each of the battery cells 26. The example label 30 generally includes an information portion, a temperature responsive portion, and a strain responsive portion. The temperature responsive portion may include the strain responsive portion, and vice versa. The temperature responsive portion, the strain responsive portion, or both could also be used as part of the identification portion of the label 30.

The label 30 is a type of inspection aid or diagnostic tool. In some examples, the label 30 is painted on the surface 32. In another example, the label 30 is adhesively secured to the surface 32 of the battery cell 26. The surface 32 is typically part of a metallic case (or pouch) of the battery cell. The label 30 may be a single unitary structure or a collection of individually separate components.

In this example, an optical device 34, such as a digital camera, can optically scan the label using lasers, charge coupled device (CCD) imagers, active pixel sensors, or other types of optical recognition or sensing techniques.

At least a portion of the example label 30 includes a matrix code, such as a barcode, representing data relating to, among other things, a serial number of the battery cell 26 that the label 30 is secured to. The barcode can be a stacked barcode, linear barcode, etc.

The matrix code is a type of identification portion, and the barcode is type of matrix code. In other examples, the identification portion is another type of matrix code, such as an Aztec code, DateGlyph, Data Matrix, MaxiCode, Qode, or Shotcode.

Scanning the label 30 allows a user to collect the data represented by the barcode. A controller 38 collects the data represented by the barcode. The data may be compiled by the controller 38 for review on a display, print out, etc.

The barcode of the label 30 may instead, or in addition to, represent data relating to the battery pack 14, vehicle 10, or both. Other example data represented by the barcode includes the date of manufacture for the battery cell 26, the place of manufacture, and other types of data useful for identifying features of the battery cell 26 and surrounding structures.

In the example label 30, the temperature responsive portion is a thermochromic material, such as thermochromic paint. The thermochromic material changes color in response to temperature. For purposes of this disclosure, a change in color can refer to the image color as well as a change in color tone.

During the scan of the label 30 the optical device 34 detects a color of the temperature responsive portion the label 30. The detected color is compared to a reference color to determine a temperature of the label.

The example controller 38 is operably connected to a database 42 of reference colors and the temperatures associated with those colors. In some examples, the scan of the label initiates access to a database that is online. A reference, or baseline label image, can be associated with the barcode in the database 42.

The controller 38 may execute an image recognition/processing program comparing the color revealed in the scan of the label 30 to the reference colors contained within the database 42 to determine the temperature. The image recognition/processing program may be executed either by the controller or on a server. The controller 38 may utilize image recognition software to assist with the comparison.

In some examples, the database 42 also stores a color and temperature history of the label 30 and the associated battery cell 26. As the label 30 is repeatedly scanned over the life of the battery cell 26, the detected colors and their temperatures are stored within the database 42.

A color difference between a color detected in a scan and a color detected in a previous scan indicates a temperature change. Because the label 30 is secured directly to the surface 32, the temperature change can be considered a temperature change of the surface 32 and, more generally, a temperature change of the battery cell 26. Thus, scans of the label by the optical device 34 can reveal a temperature of the battery cell 26.

In some examples, the thermochromic material changes color as temperature fluctuates. Thus, the thermochromic material represents a temperature at a time of the scan by the optical device 34.

In other examples, the thermochromic material change color permanently after reaching a certain temperature. That is, the change to color remains even if the temperature of the battery cell 26 decreases from that temperature.

For example, the thermochromic material of the label 30 may change from black to red if the label 30 is exposed to temperatures above 150° F. The thermochromic material is designed such that the red coloring stays even if the temperature decreases from the 150° F. temperature. A subsequent scan of the label 30 by the optical device 34 would then reveal that the battery cell 26 and associated label 30 had experienced temperatures exceeding the 150° F. threshold temperature, even if their current temperature was significantly less than 150° F. Identifying if the battery cell 26 has ever reached certain temperature may be helpful when evaluating service requirements.

In addition to the information portion and the temperature responsive portion, the label 30 additionally includes the strain responsive portion, which includes the first line 46a and the second line 46b as reference positions. Changes in the relative or absolute positions of first line 46a and the second line 46b can be used to determine the strain across the surface 32.

For example, the first line 46a is spaced a distance D from the second line 46b. Internal pressure within the battery cell 26 causes the battery cell 26 to swell. As can be appreciated, this increases the distance D. The example optical device 34 measures the distance D during the scan. The distance D is communicated to the controller 38.

The controller 38, utilizing the measurement of the distance D, calculates strain on the area of the battery cell 26 near the label 30. The levels of strain can be calculated using actual changes in length in the distance D, changes in length ratios, etc.

The measurement of strain across the surface 32 can be correlated to the current pressure within the battery cell 26, or a past pressure within the battery cell 26. These correlations can be stored and accessed from the database 42. Both tensile or compressive strain may be correlated to a rise in pressure depending on the location of the label, i.e. the cell may "contract" at some locations, such as near edges, as the pressure increases.

A technician may rely on test results in a lab to develop the particular levels of strain corresponding to a particular internal pressure within the battery cell 26. The controller 38, utilizing the measurement of strain, determines an estimated internal pressure within the battery cell 26. The levels of strain corresponding to the particular internal pressure may be stored within the database 42.

Generally, strain, ε, is a dimensionless number indicating a relative deformation resulting from a stress field induced by applied forces or pressure, or due to changes in the temperature field inside the body. Strain can occur in any direction of a coordinate system and can be monitored by the displacement of reference points, such as the lines 46a and 46b.

In this example, changes of the distance D with respect to established initial conditions are optically read to assess the physical condition of the object to be monitored, here the battery cell 26. Thus, reference color and position information can be collected during the optical reading of the label 30.

In some examples where multiple reference point relative or absolute changes in several different directions can be used to characterize the direction and magnitude of strain. Alternatively, the ratios of the relative or absolute changes in different directions can be used to characterize the direction and magnitude of strain. Further, a specific or preferential direction may also be chosen on the basis that it provides a better correlation with pressure for calibration purposes.

Individuals responsible for maintaining the battery pack 14 may periodically scan the label 30 and the labels 30' of other battery cells within the array 24. This information is saved within the database 42 of the controller. Significant changes in monitored temperatures, strain, or both may prompt the technician to replace one or more of the battery cells 26. In addition to collecting information about the cell from a database (e.g. on a website, cloud server) the newly collected information from the label 30 about temperature, strain or pressure history and be uploaded to the database 42 for future reference and comparison.

Although the label 30 is described for use in connection with battery cells 26, those skilled in the art and having the benefit of this disclosure may understand other items that would benefit from the label 30. For example, the disclosure could be used monitor other items sensitive to heat, pressure or stress, such as structural parts in aircrafts, components of boilers and pressure vessels, etc.

Figure 4B:
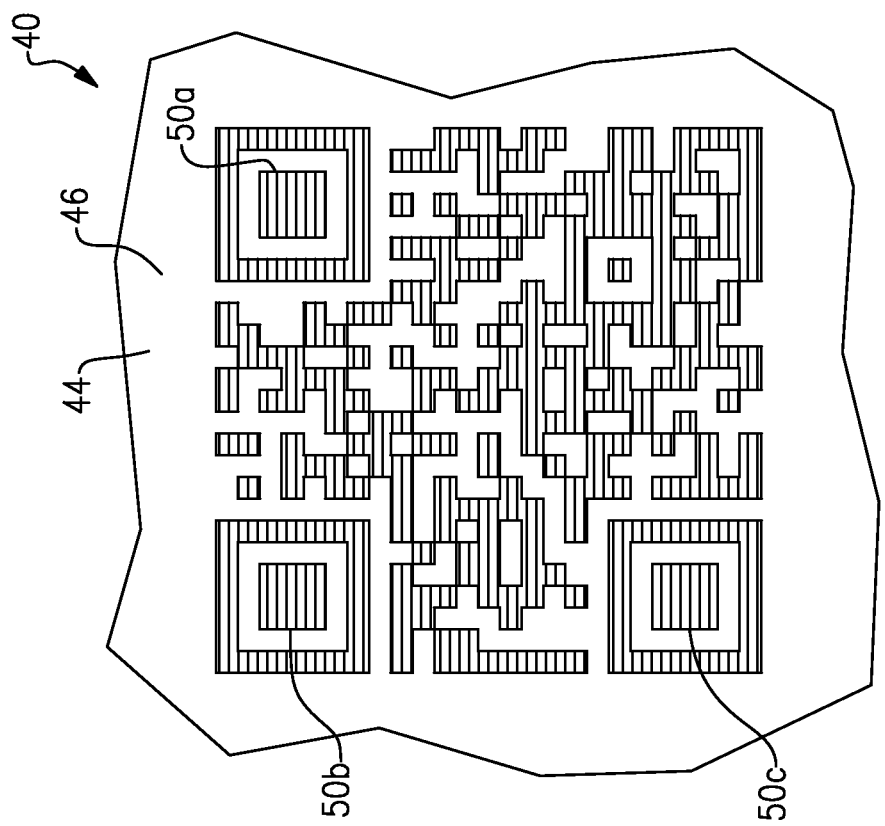
FIG. 4B illustrates the label of FIG. 4A after the battery cell has heated and expanded relative to the battery cell of FIG. 4A.
Figure 4A:
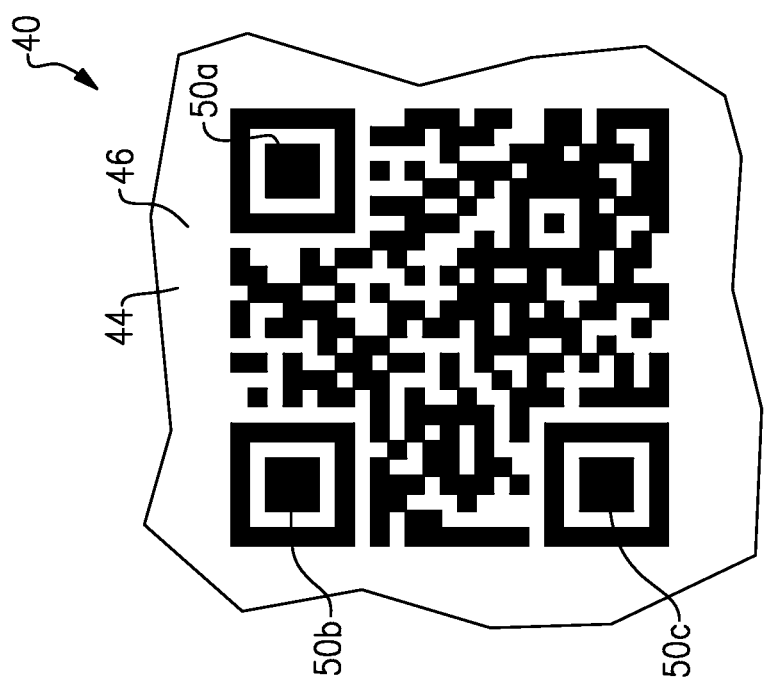
FIG. 4A illustrates a label attached to a battery cell in another example embodiment.

Referring now to FIGS. 4A and 4B, another example label 40 is imprinted with a matrix code, such as a quick response (QR) code, rather than a lined barcode. The label 40 comprises thermochromic paint imprinted on a surface 44 of a battery cell 26. The thermochromic paint provides the thermochromic portion of the label 40. Color changes in the thermochromic paint indicate temperature changes. In this example, the label 40 in the environment of FIG. 4B is at a significantly higher temperature, and a different color, than the label 40

The label 40 further has a strain responsive portion. Within the label 40, the reference points are represented by geometric patterns, such as a first dot 50a, a second dot 50b, and a third dot 50c. An optical device scanning the label 40 can provide information to the controller 38 that determines the distance and relative positions of the first dot 50a, the second dot 50b, and the third dot 50c. These measurements reveal positional changes of the dots, which can be utilized to determine pressure or pressure history, within a battery cell.

In this example, the distances between the first dot 50a, the second dot 50b, and the third dot 50c are greater for the label 40 in the environment of FIG. 4B than the label of FIG. 4A. This means that the surface 44 in the environment of FIG. 4B is strained more than the surface 44 in the environment of FIG. 4A, and that internal pressure of the battery cells 26 in the environment of FIG. 4A is greater than the internal pressure of the battery cells 26 in the environment of FIG. 4B.

Features of this disclosure includes a label providing both temperature and pressure information about a battery cell. Collecting this information from the same label reduces inspection time, diagnostic time, cost, and errors. The collecting may involve a calibration to reflect changes in internal pressure as a function of measured strain along specific directions.

The pressure and temperature information measured from the label, or the history of this information, together with relatively quick access to a database containing baseline information, provides a quick and reliable diagnostic tool for state of health monitoring of battery cells, or pressure/temperature sensitive items. In some examples, the temperature, strain and pressure history may simultaneously be uploaded one an online server for processing with respect to previous data and/or future reference.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims

I claim:
1. An inspection aid, comprising:
a label secured to an outwardly facing surface of a battery cell, the label having a temperature responsive portion that indicates temperature changes of the battery cell, and a strain responsive portion that indicates positional changes.
2. The inspection aid of claim 1, wherein the temperature responsive portion comprises a thermochromic material that changes color in response to temperature changes.

3. The inspection aid of claim 2, wherein the thermochromic material comprises thermochromic ink.

4. The inspection aid of claim 1, further comprising a controller, and a plurality of reference points within the strain responsive portion, wherein a first one of the plurality of the reference points is spaced a distance from a second one of the plurality of reference points, wherein the distance increases in response to a pressure within a battery increasing, and the distance decreases in response to the pressure within the battery decreasing, wherein the controller is configured to calculate strain on an area of the battery near the label using the distance.

5. The inspection aid of claim 1, further comprising an identification portion of the label, the identification portion containing identification information.

6. The inspection aid of claim 5, wherein the identification portion provides at least some of the temperature responsive portion and at least some of the strain responsive portion, wherein the temperature responsive portion comprises a thermochromic material that changes color in response to temperature changes.

7. The inspection aid of claim 5, wherein the identification portion comprises a bar code.

8. The inspection aid of claim 5, wherein the identification portion comprises a quick response code.

9. The inspection aid of claim 1, wherein the battery cell is a battery cell of an electric vehicle, and the label is attached to no more than one side of the battery cell.

10. The inspection aid of claim 1, wherein the battery cell is lithium ion battery cell and the label is printed on a case of the lithium ion battery cell.

11. A method of inspecting, comprising:
detecting changes in a temperature of a battery from a temperature responsive portion of a label; and
detecting changes in a strain of the battery from a strain responsive portion of the label.

12. The method of claim 11, wherein changes in a color of the temperature responsive portion indicate a change in temperature.

13. The method of claim 12, wherein the strain responsive portion comprises reference coordinates on a single, generally planar side of the battery, and a change in a relative position of the reference coordinates indicate a change in strain.

14. The method of claim 13, further comprising optically reading the label to collect the color and the position.

15. The method of claim 13, wherein a distance between at least some of the reference coordinates that increases over time indicates tensile strain, and a distance between at least some of the reference coordinates that decreases over time indicates compressive strain.

16. The method of claim 15, further comprising estimating pressure within the battery using strain.

17. The method of claim 11, further comprising collecting identification information about the battery during an optical reading of an information portion of the label.

18. The method of claim 11, further comprising securing the label directly to a first side of the battery, the label secured exclusively to the first side, wherein the battery is a battery within an array of a battery pack, the array disposed and compressed along an axis such that a second side of the battery transverse to the first side interfaces with an axially adjacent battery, the first side facing away from the axis.

19. The method of claim 11, further comprising painting the label directly on the battery, the label that is painted on the battery including both the temperature responsive portion and the strain responsive portion.

20. The method of claim 11, further comprising referencing a database during the detecting, the database comprising at least one reference color associated with at least one temperature.

21. The method of claim 20, further comprising updating the database using information from during the detecting.

22. The method of claim 11, further comprising diagnosing that a battery should be replaced based on the changes in the temperature.

23. A method of inspecting, comprising:
detecting temperature changes of a battery cell based on a thermochromatic material of a label changing color, the label adhesively secured directly to a surface of a metallic case of the battery cell;
scanning the label to detect a position of a reference coordinate of the label relative to another reference coordinate of the label; and
evaluating strain based on the position.

* * * * *